United States Patent
Gupta et al.

(10) Patent No.: US 12,323,661 B2
(45) Date of Patent: Jun. 3, 2025

(54) SYSTEMS AND METHODS FOR PREDICTING AND RESOLVING HARDWARE AND/OR CLOUD STORAGE CONFLICTS

(71) Applicant: Adeia Guides Inc., San Jose, CA (US)

(72) Inventors: Vikram Makam Gupta, Karnataka (JP); Vishwas Sharadanagar Panchaksharaiah, Tiptur (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 16/837,383

(22) Filed: Apr. 1, 2020

(65) Prior Publication Data

US 2021/0314663 A1 Oct. 7, 2021

(51) Int. Cl.
*H04N 21/458* (2011.01)
*H04N 21/4335* (2011.01)
*H04N 21/438* (2011.01)
*H04N 21/4425* (2011.01)
*H04N 21/45* (2011.01)

(52) U.S. Cl.
CPC ..... *H04N 21/4583* (2013.01); *H04N 21/4335* (2013.01); *H04N 21/4383* (2013.01); *H04N 21/4425* (2013.01); *H04N 21/4532* (2013.01)

(58) Field of Classification Search
CPC ............ H04N 21/4583; H04N 21/435; H04N 21/4383; H04N 21/4335; H04N 21/4425; H04N 21/4532
USPC ........................................................ 725/142
See application file for complete search history.

(56) References Cited

U.S. PATENT DOCUMENTS

| | | | |
|---|---|---|---|
| 6,756,997 B1* | 6/2004 | Ward, III | G06Q 30/0269 715/716 |
| 9,015,749 B2* | 4/2015 | Alexander | H04N 21/6125 725/35 |
| 9,240,217 B2* | 1/2016 | Lovell | H04N 5/782 |
| 2006/0206912 A1* | 9/2006 | Klarfeld | H04N 21/251 725/40 |
| 2008/0141310 A1* | 6/2008 | Kunkel | H04N 7/0122 348/E5.111 |
| 2010/0031162 A1* | 2/2010 | Wiser | H04N 21/431 715/747 |
| 2012/0066714 A1* | 3/2012 | Son | H04N 5/782 725/37 |
| 2014/0088952 A1* | 3/2014 | Fife | H04N 21/4667 704/9 |
| 2014/0355963 A1* | 12/2014 | Babu | H04N 21/47214 386/292 |
| 2015/0003814 A1* | 1/2015 | Miller | H04N 21/4334 386/297 |
| 2015/0052568 A1* | 2/2015 | Glennon | H04N 21/482 725/100 |

(Continued)

*Primary Examiner* — Michael R Telan
(74) *Attorney, Agent, or Firm* — Haley Guiliano LLP

(57) ABSTRACT

Systems and methods are disclosed herein for predicting a hardware conflict and prompting a corrective action to address the predicted hardware conflict. The system will determine items predicted to be interest for recording or viewing and based on the regularly scheduled recordings and the items predicted to be of interest, predicts a hardware conflict. The system will predict the conflict and prompt the user with a corrective action to address the hardware conflict in advance of when it would occur to provide time to correct the hardware conflict.

21 Claims, 6 Drawing Sheets

(56) References Cited

U.S. PATENT DOCUMENTS

| | | | |
|---|---|---|---|
| 2015/0319494 A1* | 11/2015 | Dhanabalan | H04N 21/47214 |
| | | | 386/293 |
| 2016/0029085 A1* | 1/2016 | Mountain | H04N 21/4583 |
| | | | 725/43 |
| 2017/0195731 A1* | 7/2017 | Girlando | H04N 21/4312 |
| 2017/0280196 A1* | 9/2017 | Thomas | H04N 21/4532 |
| 2019/0342143 A1* | 11/2019 | Lin | H04L 67/1076 |

* cited by examiner

SYSTEMS AND METHODS FOR PREDICTING AND RESOLVING HARDWARE AND/OR CLOUD STORAGE CONFLICTS

BACKGROUND

The present disclosure relates to systems and methods for predicting hardware conflicts, and more particularly, to systems and methods for predicting a hardware conflict based on content items scheduled for recording and content items predicted to be of interest.

SUMMARY

As the amount of content available to users continues to increase, so comes an increase in users' desires to record and view content. When a user schedules programs for recording, recording hardware having sufficient resources for all of the recordings will avoid conflicts. But these recordings were scheduled based on known information. As more programs become available after the recordings are set up, new programs may predictably be of interest to the user. As a result, a predictive hardware conflict exists-a conflict between an already-scheduled recording, and a potential recording of a program of interest.

Accordingly, to overcome these problems, systems and methods are disclosed herein for predicting a hardware conflict and prompting a corrective action to address the predicted hardware conflict. In some embodiments, the system predicts a hardware conflict based on content items scheduled for recording and predicted user interest in content items. If the user decides to watch or record the content items predicted to be of interest, a hardware conflict may arise, thereby preventing the user from accessing all of the user's desired content items. Accordingly, the system will instead predict the conflict and prompt the user with a corrective action to address the hardware conflict in advance of when it would occur, to provide time to correct the hardware conflict.

The systems and methods described herein, in advance of an actual hardware conflict, obtain the schedule of recordings of one or more first content items, and predict a one or more second content item to be of interest to the user based on a user profile, and the content item's metadata. This one or more second content item may be new content (e.g., new show, sports broadcast, etc.) or another type of content that is predicted to be of interest to the user based on a user profile (e.g., a user's previous recording or viewing history). When the system predicts that recording the one or more first content items and viewing or recording the one or more second content items will result in a hardware conflict, the system will prompt a corrective action to address the hardware conflict, for example, an upgrade to a device with more storage or additional tuners. Therefore, the methods and systems disclosed herein resolve a predictive hardware conflict in a way that ensures hardware capacity is addressed (e.g., a sufficient number of tuners) in advance of the hardware conflict occurring and actually desired content items (e.g., first content items and predicted content items) are recorded or viewed by the user.

In one embodiment, predicting the hardware conflict may include considering whether the scheduled recordings of the first content items overlap in time with any of the second content items predicted to be of interest to the user. When the first content items overlap in time with any of the content items predicted to be of interest to the user, the system may determine if a sufficient number of tuners are available for viewing or recording the one or more second content items overlapped by the one or more first content items. If the number of tuners to record the overlapped content items is not sufficient, a hardware conflict exists and the system would prompt for a corrective action.

In another embodiment, predicting the hardware conflict may include determining an available storage space on hardware equipment (e.g., storage device) and calculating the storage needed for viewing or recording the one or more first content items. The system may calculate the storage needed for viewing or recording the one or more second content items (e.g., content items predicted to be of interest to the user). Further, in response to determining the available storage on the hardware equipment, and the storage needed for viewing or recording the one or more first content items and the one or more second content items (e.g., content items predicted to be of interest to the user), the system may predict a hardware conflict based on not enough storage capacity for viewing and recording all of the one or more first content items and the one or more second content items. For example, a user has a number of upcoming schedule recordings (e.g., "Friends," "Seinfeld," etc.) and available storage space is near storage capacity. Based on the user profile, the system predicts that the user may enjoy watching or recording soccer matches at the World Cup, and the World Cup schedule was just announced. The system determines an upcoming content program (e.g., one or more World Cup games) that the user is likely to view or record and determines that the hardware equipment (e.g., a video recorder) does not have enough storage to view or record the first content items (e.g., prescheduled recordings) and the second content items predicted to be of interest to the user (e.g., upcoming World Cup games) and prompts (via push) an advertisement to upgrade the hardware equipment (e.g., a higher capacity video recorder) with additional tuners or larger storage capacity that would satisfy the first content items (e.g., preexisting recordings) and the content items predicted to be of interest to the user (e.g., upcoming programing such as World Cup games).

According to another embodiment, if the system determines when a first content item overlaps in time with any of the content items predicted to be of interest to the user, the system may consider the available number of tuners to record the overlapped items to determine if a sufficient number of tuners exist to record all of the overlapped content items. If the number of tuners to record the overlapped content items is not sufficient, a hardware conflict would exist and the system would prompt for a corrective action. In another example, the system determines a maximum number of overlapping content items that may be recorded based on the number of tuners available to view or record content items. In another example, the system considers recording hardware and the storage required to view or record the number of content items, and, in response to not having sufficient storage capacity to record the number of content items, predicts a hardware conflict. For example, the system may determine that the available recording hardware has the capacity to record 20 hours of content items, and based on the predicted content items requiring 30 hours of recordings, the system will predict a hardware conflict and prompt a corrective action to the hardware conflict. Therefore, the methods and systems disclosed herein predict a hardware conflict based on insufficient tuner availability or exceeded storage capacity, and prompt the user with a corrective action to address the hardware conflict in advance of when it would occur to provide time to correct the hardware conflict.

BRIEF DESCRIPTION OF THE DRAWINGS

The above and other objects and advantages of the disclosure will be apparent upon consideration of the following detailed description, taken in conjunction with the accompanying drawings, and in which.

DETAILED DESCRIPTION

Systems and methods described herein for predicting a hardware conflict and prompting a corrective action to address the predicted hardware conflict. In one embodiment, systems and methods, in advance of an actual hardware conflict, obtain the schedule of recordings of one or more first content items, and predict a second content item to be of interest to the user based on a user profile and the content item's metadata. This second content item may be new content (e.g., new show, sports broadcast, etc.) or another type of content that is predicted to be of interest to the user based on a user profile (e.g., a user's previous recording or viewing history).

Figure 1:
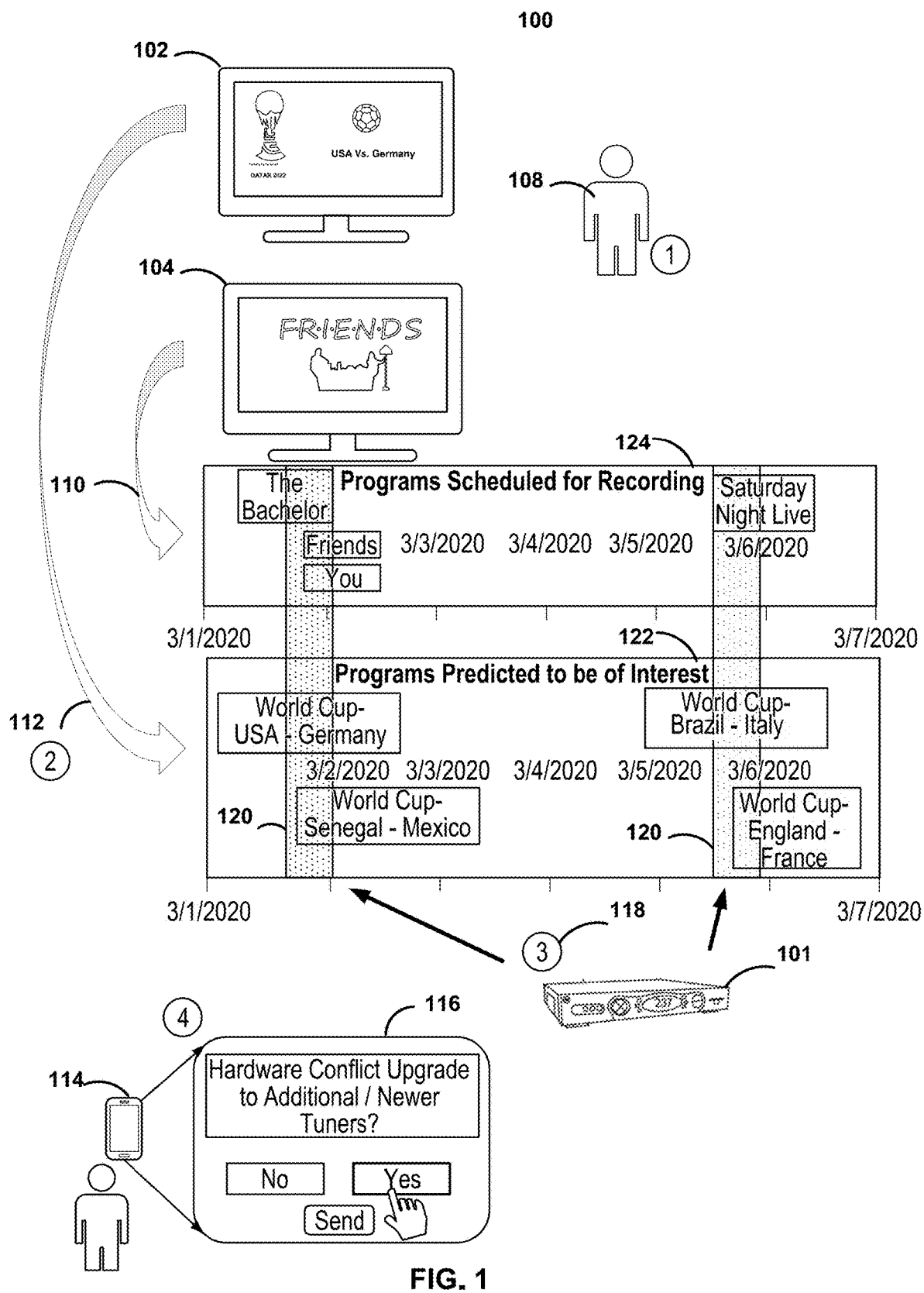
FIG. 1 shows an illustrative example of a scenario of predicting a hardware conflict when predictive content items of interest are identified, in accordance with one embodiment.

FIG. 1 shows an illustrative example of a scenario of predicting a hardware conflict when predicted content items of interest are identified, in accordance with one embodiment. In the example shown in FIG. 1, the system 100, in advance of an actual hardware conflict, predicts that a hardware conflict is likely to occur and prompts the user with a corrective action. The system 100 includes a hardware recording device 101, a user's profile 108, programs scheduled for recording 104 and programs predicted to be of interest 102. For each of the programs predicted to be of interest 102 and programs scheduled for recording 104, the system determines a schedule of the programs as illustrated by the first schedule 124 for programs scheduled for recording 104 and second schedule 122 for programs predicted to be of interest 102.

In one embodiment, based on the first schedule 124 and the second schedule 122, the system predicts a hardware conflict. The hardware conflict can include not having a sufficient number of tuners or not having sufficient storage capacity. In another embodiment, the system determines a number of programs scheduled for recording 104 and programs predicted to be of interest 102 that overlap. Based on the number of tuners included in the hardware recording device, the system predicts the maximum number of content items that can be viewed or recorded at the desire of the user. Based on the number of overlapping content items (e.g., programs scheduled for recording 104 and programs predicted to be of interest 102), the system determines whether a sufficient number of tuners are available. When not enough tuners are available, a hardware conflict is predicted. In response to the hardware conflict being predicted, the system alerts the user with an advertisement to upgrade the hardware equipment (e.g., a higher-capacity video recorder) with additional tuners or larger storage capacity that would accommodate the first content items (e.g., scheduled recordings) and the content items predicted to be of interest to the user (e.g., upcoming programing such as World Cup games).

In other embodiments, the system determines whether content items overlap by identifying a start time and an end time of the one or more first content items and the one or more second content items. The system then determines whether the start time and the end time of the one or more first content items fall within the start time and the end time of the one or more second content items. For example, a first show start time and end time is compared against a second show start time and end time to determine if any parts of the shows overlap. When any parts of the shows (e.g., first and second content items) overlap, the system requires a separate tuner for viewing and recording each content item. If, on the other hand the content items do not overlap a single tuner can be used to view and record both content items.

In other embodiments, the system determines whether a hardware conflict exists by calculating the available storage space on the storage device. For example, the system determines the available storage on the storage device, and determines an amount of storage space required for viewing and recording the scheduled recordings (e.g., "Friends," "The Bachelor," etc.). The system determines an amount of storage required for second content items, predicted to be of interest to the user. The system predicts a hardware conflict based on the amount of storage space required for the first content item and the second content item exceeding the available storage on the storage device.

Figure 2:
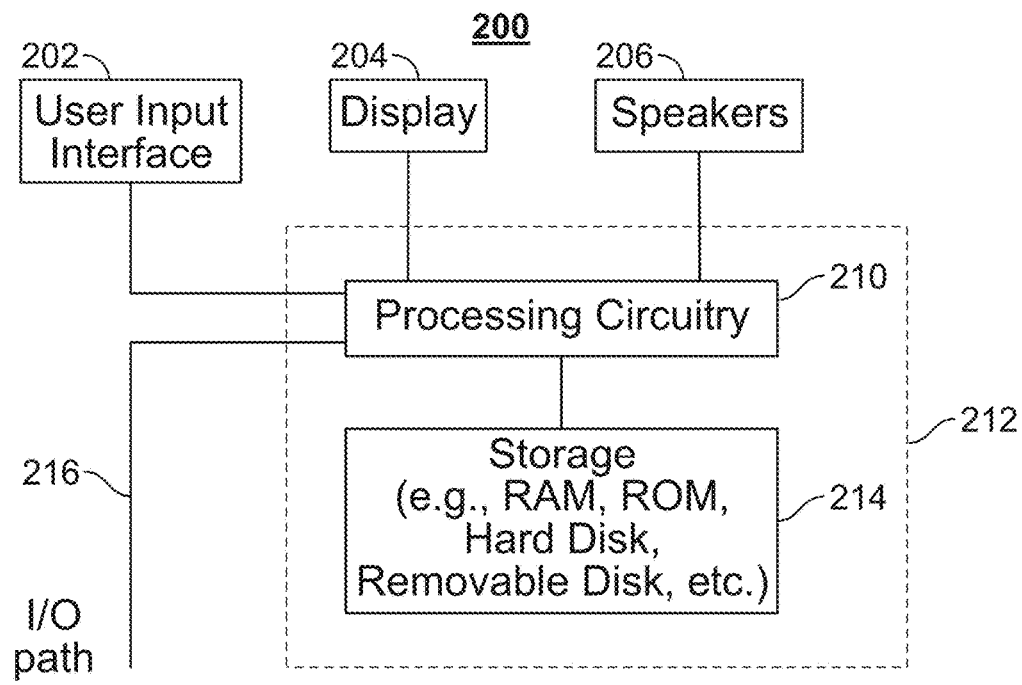
FIG. 2 shows an illustrative example of an equipment device having a recording manager implemented thereon, in accordance with one embodiment.

FIG. 2 shows a generalized embodiment of an illustrative equipment device 200 (e.g., recording device 101). More specific implementations of equipment devices are discussed below in connection with FIG. 3. Equipment device 200 may receive content and data via input/output (hereinafter "I/O") path 216. I/O path 216 may provide content (e.g., broadcast programming, on-demand programming, Internet content, content available over a local area network (LAN) or wide area network (WAN), and/or other content) and data to control circuitry 212, which includes processing circuitry 210 and storage 214. Control circuitry 212 may be used to send and receive commands, requests, and other suitable data using I/O path 216. I/O path 216 may connect control circuitry 212 (and specifically processing circuitry 210) to one or more communication paths (described below). I/O functions may be provided by one or more of these communication paths but are shown as a single path in FIG. 2 to avoid overcomplicating the drawing.

Control circuitry 212 may be based on any suitable processing circuitry such as processing circuitry 210. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 212 executes instructions for a media application stored in memory (i.e., storage 214). Specifically, control circuitry 212 may be instructed by a recording manager to perform the functions described above and below. For example, the recording manager may provide instructions to control circuitry 212 to generate the user interface displays.

In some implementations, any action performed by control circuitry 212 may be based on instructions received from the recording manager. The recording manager may be a stand-alone application, a part of a guide, a part of a middleware of the equipment device 200, or a part of the operating system installed on the equipment device 200 (discussed in greater detail below).

In client/server-based embodiments, control circuitry 212 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of recording devices, or communication of recording devices in locations remote from each other (described in more detail below).

Memory may be an electronic storage device provided as storage 214 that is part of control circuitry 212. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Computer-readable media includes any media capable of storing instructions and/or data. The computer-readable media may be transitory, including, but not limited to, propagating electrical or electromagnetic signals, or may be non-transitory including, but not limited to, volatile and nonvolatile computer memory or storage devices such as a hard disk. Storage 214 may be used to store various types of content described herein as well as media guidance data described above. Nonvolatile memory may also be used (e.g., to launch a boot-up routine and other instructions). Cloud-based storage may also be used to supplement storage 214 or instead of storage 214.

Control circuitry 212 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 212 may also include scalar circuitry for upconverting and down converting content into the preferred output format of the recording 200. Control circuitry 212 may also include digital-to-analog converter circuitry and analog-to-digital converter circuitry for converting between digital and analog signals. The tuning and encoding circuitry may be used by the recording device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 214 is provided as a separate device from equipment device 200, the tuning and encoding circuitry (including multiple tuners) may be associated with storage 214.

A user may send instructions to control circuitry 212 using user input interface 202. User input interface 202 may be any suitable user interface, such as a remote control, mouse, trackball, keypad, keyboard, touch-screen, touchpad, stylus input, joystick, voice recognition interface, or other user input interfaces. Display 204 may be provided as a stand-alone device or integrated with other elements of equipment device 200. For example, display 204 may be a touchscreen or touch-sensitive display. In such circumstances, user input interface 202 may be integrated with or combined with display 204. Display 204 may be one or more of a monitor, a television, a liquid crystal display (LCD) for a mobile device, amorphous silicon display, low temperature poly silicon display, electronic ink display, electrophoretic display, active matrix display, electro-wetting display, electro fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 204 may be HDTV-capable. In some embodiments, display 204 may be a 3D display, and the interactive user interface and any suitable content may be displayed in 3D. A video card or graphics card may generate the output to the display 204. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 212. The video card may be integrated with the control circuitry 212. Speakers 206 may be provide as integrated with other elements of equipment device 200 or may be stand-alone units. The audio component of videos and other content displayed on display 204 may be played through speakers 206. In some embodiments, the audio may be distributed to a receiver (not shown), which processes and outputs the audio via speakers 206.

The recording manager may be implemented using any suitable architecture. For example, it may be a stand-alone application wholly implemented on equipment device 200. In such an approach, instructions of the application are stored locally (e.g., in storage 214), and data for use by the application is downloaded on a periodic basis (e.g., from an out-of-band feed, from an Internet resource, or using another suitable approach). Control circuitry 212 may retrieve instructions of the application from storage 214 and process the instructions to generate any of the displays discussed herein. Based on the processed instructions, control circuitry 212 may determine what action to perform when input is received from user input interface 202. For example, movement of a cursor on a display up/down may be indicated by the processed instructions when user input interface 202 indicates that an up/down button was also selected.

In some embodiments, the recording manager is a client/server-based application. Data for use by a thick or thin client implemented on equipment device 200 is retrieved on demand by issuing requests to a server remote to the equipment device 200. In one example of a client/server-based recording manager, control circuitry 212 runs a web browser that interprets web pages provided by a remote server. For example, the remote server may store the instructions for the application in a storage device. The remote server may process the stored instructions using circuitry (e.g., control circuitry 212) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via user input interface 202 and transmit those inputs to the remote server for processing and generating the corresponding displays. For example, equipment device 200 may transmit a communication to the remote server indicating that an up/down button was selected via user input interface 202. The remote server may process instructions in accordance with that input and generate a display of the application corresponding to the input (e.g., a display that moves a cursor up/down). The generated display is then transmitted to equipment device 200 for presentation to the user.

Figure 3:
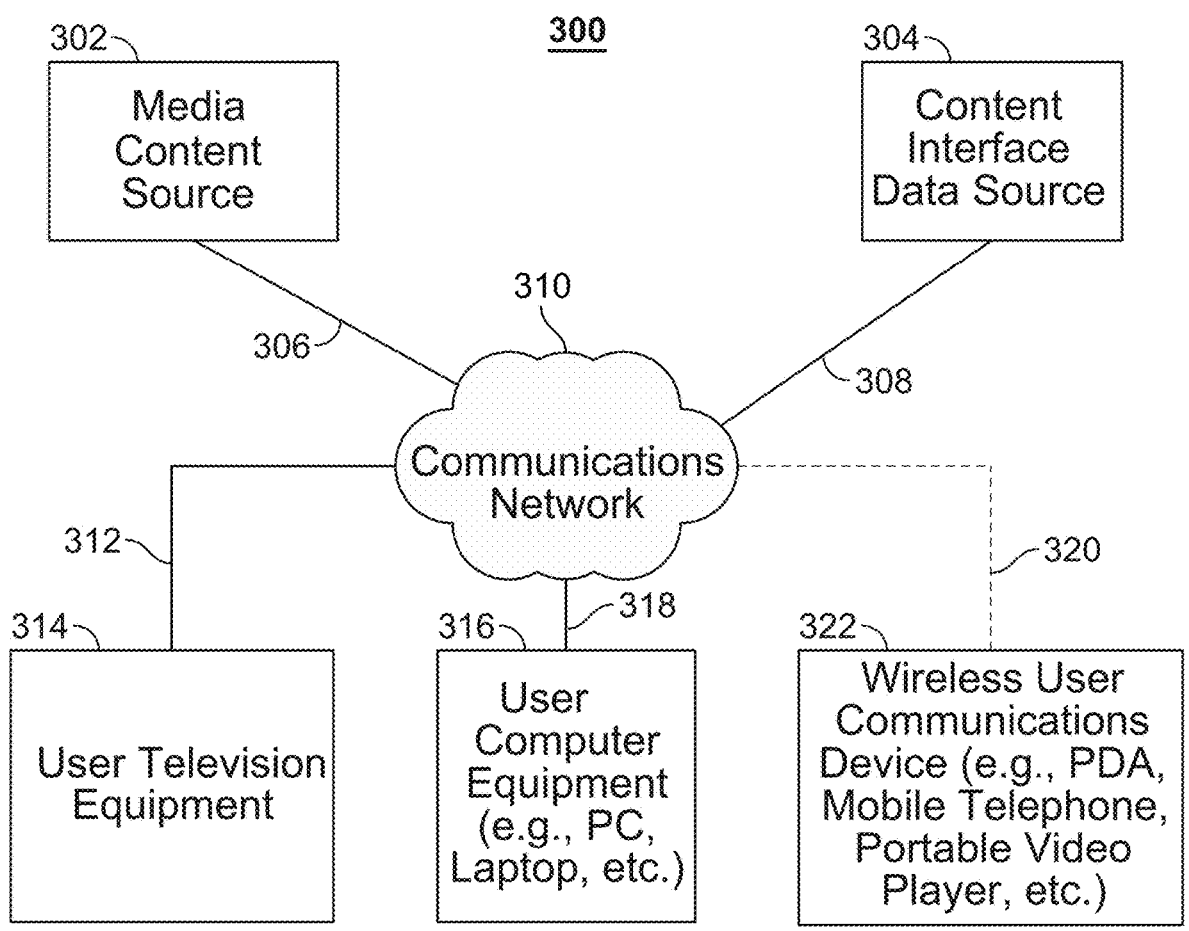
FIG. 3 shows an illustrative media system in accordance with one embodiment.

Equipment device 200 of FIG. 2 can be implemented in system 300 of FIG. 3 as user television equipment 314, user computer equipment 316, wireless user communication device 322, or any other type of recording suitable for accessing content, such as a non-portable gaming machine. For simplicity, these devices may be referred to herein collectively as recording or recording devices and may be substantially similar to recording devices described above. Recording devices, on which a recording manager may be implemented, may function as a standalone device or may be part of a network of devices. Various network configurations of devices may be implemented and are discussed in more detail below.

A recording device utilizing at least some of the system features described above in connection with FIG. 2 may not be classified solely as user television equipment 314, user computer equipment 316, or a wireless user communications device 322. For example, user television equipment 314 may, like some user computer equipment 316, be Internet-enabled allowing for access to Internet content, while user computer equipment 316 may, like some television equipment 314, include a tuner allowing for access to television programming. The recording manager may have the same layout on various different types of recording or may be tailored to the display capabilities of the recording. For example, on user computer equipment 316, the guidance application may be provided as a web site accessed by a web browser. In another example, the guidance application may be scaled down for wireless user communications device 322.

In system 300, there is typically more than one of each type of recording device but only one of each is shown in FIG. 3 to avoid overcomplicating the drawing. In addition, each user may utilize more than one type of recording device and also more than one of each type of recording device.

The recording devices may be coupled to communications network 310. Namely, user television equipment 314, user computer equipment 316, and wireless user communications device 322 are coupled to communications network 310 via communication paths 312, 318, and 320, respectively. Communications network 310 may be one or more networks including the Internet, a mobile phone network, mobile voice or data network (e.g., a 4G or LTE network), cable network, public switched telephone network, or other types of communications network or combinations of communications networks. Paths 312, 318, and 320 may separately or together include one or more communication paths, such as, a satellite path, a fiber-optic path, a cable path, a path that supports Internet communications (e.g., IPTV), free-space connections (e.g., for broadcast or other wireless signals), or any other suitable wired or wireless communication paths or combination of such paths. Path 312 is drawn with dotted lines to indicate that in the exemplary embodiment shown in FIG. 3 it is a wireless path and paths 312 and 318 are drawn as solid lines to indicate they are wired paths (although these paths may be wireless, if desired). Communications with the recording devices may be provided by one or more of these communication paths but are shown as a single path in FIG. 3 to avoid overcomplicating the drawing.

Although communication paths are not drawn between recording devices, these devices may communicate directly with each other via communication paths, such as those described above in connection with paths 312, 318, and 320, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The recording devices may also communicate with each other directly through an indirect path via communications network 310.

System 300 includes content source 302 and media guidance data source 304 coupled to communications network 310 via communication paths 306 and 308, respectively. Paths 306 and 308 may include any of the communication paths described above in connection with paths 312, 318, and 320. Communications with the content source 302 and media guidance source data source 304 may be exchanged over one or more communication paths but are shown as a single path in FIG. 3 to avoid overcomplicating the drawing. In addition, there may be more than one of each of content source 302 and media guidance data source 304, but only one of each is shown in FIG. 3 to avoid overcomplicating the drawing. (The different types of each of these sources are discussed below.) If desired, content source 302 and media guidance data source 304 may be integrated as one source device. Although communications between sources 302 and 304 with recording devices 314, 316, and 322 are shown as through communications network 310, in some embodiments, sources 302 and 304 may communicate directly with recording devices 314, 316, and 322 via communication paths (not shown) such as those described above in connection with paths 312, 318, and 320.

Content source 302 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by Home Box Office, Inc. Content sources 302 may be the originator of content (e.g., a television broadcaster, a Webcast provider, etc.) or may not be the originator of content (e.g., an on-demand content provider, an Internet provider of content of broadcast programs for downloading, etc.). Content sources 302 may include cable sources, satellite providers, on-demand providers, Internet providers, over-the-top content providers, or other providers of content. Content source 302 may also include a remote media server user to store different types of content (including video content selected by a user), in a location remote from any of the recording devices.

Media guidance data source 304 may provide media guidance data, such as the media guidance data described above. Media guidance data may be provided to the recording devices using any suitable approach. In some embodiments, the guidance application may be a stand-alone interactive television program guide that receives program guide data via a data feed (e.g., a continuous feed or trickle feed). Program schedule data and other guidance data may be provided to the recording on a television channel sideband, using an in-band digital signal, using an out-of-band digital signal, or by any other suitable data transmission technique. Program schedule data and other media guidance data may be provided to recording on multiple analog or digital television channels.

In some embodiments, guidance data from media guidance data source 304 may be provided to users' equipment using a client-server approach. For example, a recording device may pull media guidance data from a server, or a server may push media guidance data to a recording device. In some embodiments, a guidance application client residing on the user's equipment may initiate sessions with source 304 to obtain guidance data when needed, e.g., when the guidance data is out of date or when the recording device receives a request from the user to receive data. Media guidance may be provided to the recording with any suitable frequency (e.g., continuously, daily, a user-specified period of time, a system-specified period of time, in response to a request from recording, etc.).

Figure 4:
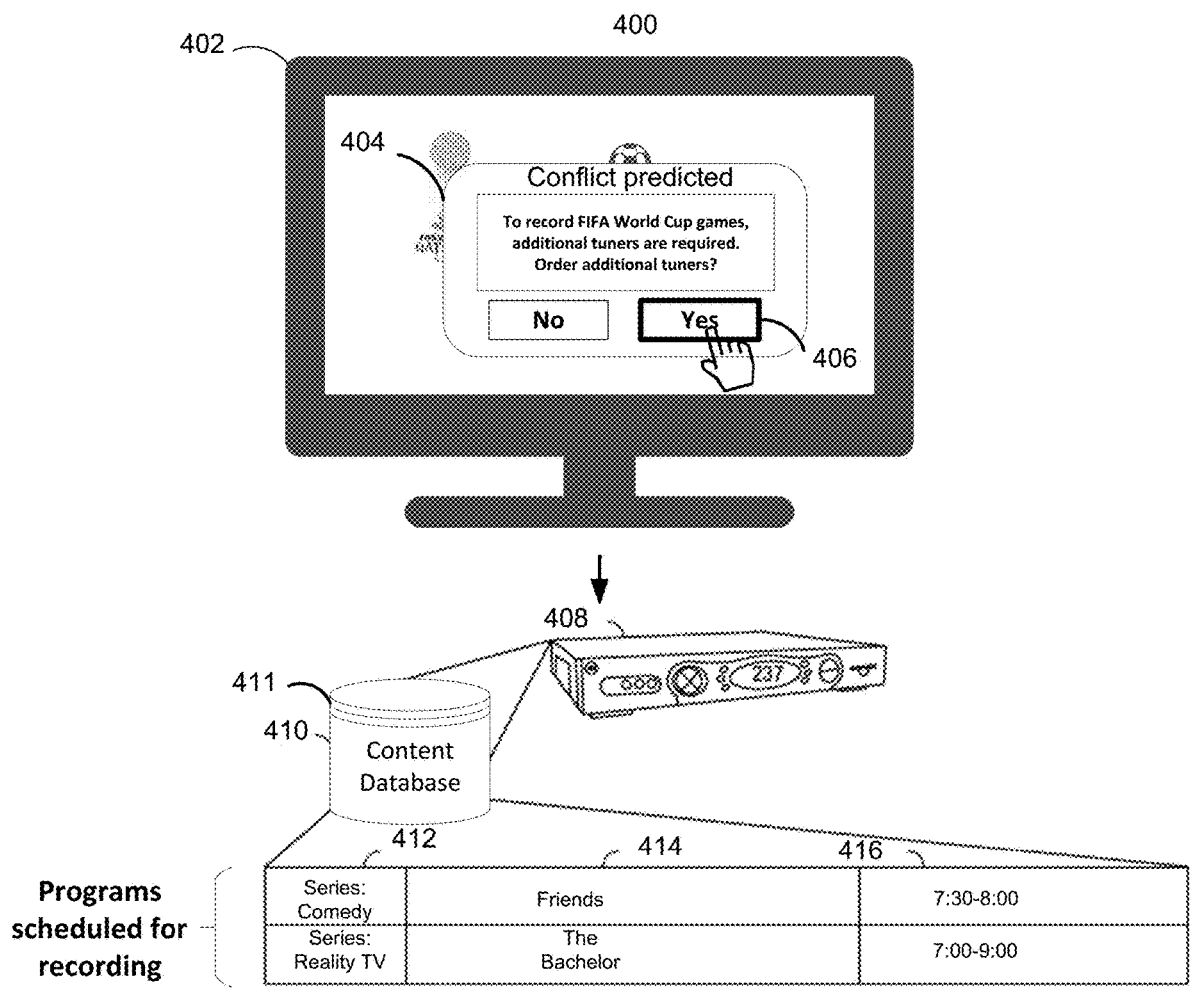
FIG. 4 depicts an illustrative user interface for alerting of a predicting a hardware conflict, in accordance with one embodiment.

FIG. 4 depicts an illustrative example of a user interface for alerting of a hardware conflict, in accordance with one embodiment. In the example shown in FIG. 4, a hardware recording device 408 is illustrated connected to a content database 410. The content database 410 illustrates an available capacity 411. The available capacity includes available storage. From the content database 410, programs scheduled for recording are listed with the type of program 412, for example, comedy, reality TV, and name of the program, for example, "Friends" and "The Bachelor" and the scheduled broadcast times 416. In response to predicting a hardware conflict on the hardware recording device 408, a user interface prompt alerting the user of a conflict predicted 404 is generated and corrective action to address the conflict is displayed on the user interface 402. For example, the control circuitry predicts a hardware conflict and alerts the user with an advertisement to upgrade the hardware equipment (e.g., a higher capacity video recorder) with additional tuners or larger storage capacity that would satisfy the first content items (e.g., preexisting recordings) and the content items predicted to be of interest to the user (e.g., upcoming programing such as World Cup games).

Figure 5:
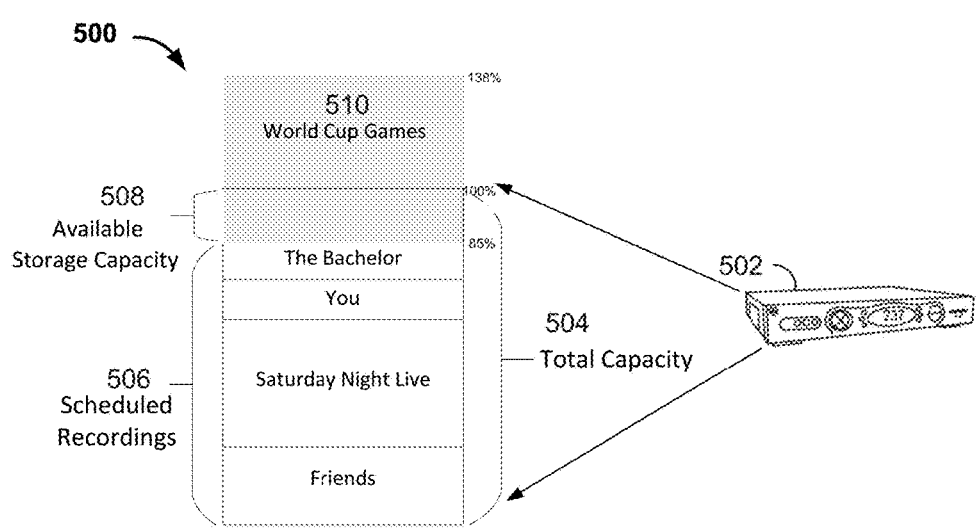
FIG. 5 depicts an illustrative example of a hardware conflict based on exceeding the storage capacity, in accordance with one embodiment.

FIG. 5 depicts an illustrative example of a hardware conflict based on exceeding the storage capacity, in accordance with one embodiment. In the example shown in FIG. 5, a hardware recording device 502 is illustrated with a total storage capacity 504. The storage from the hardware recording device is allocated to record a program of one or more first content items as scheduled by the user. The user desires to record four programs, scheduled recordings 506, for example, "Friends," "The Bachelor," "Saturday Night Live," and "You." The hardware recording device illustrates that the scheduled recordings will require 85% of the total storage capacity with an additional 15% available storage capacity 508. Content items predicted to be of interest 510, for example, World Cup Games, are illustrated utilizing the available storage capacity and requiring additional storage space. The control circuitry will be unable to view or record content items predicted to be of interest because of a lack of storage space, thereby predicting a hardware conflict.

Figure 6:
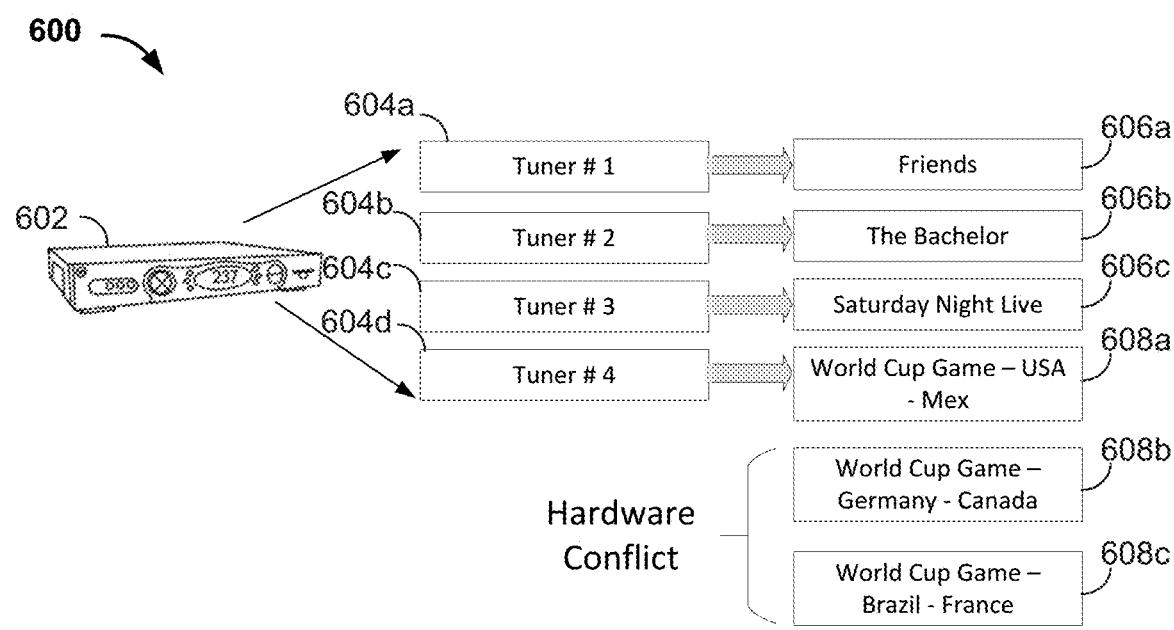
FIG. 6 depicts an illustrative example of a hardware conflict based on exceeding the tuner capacity, in accordance with one embodiment.

FIG. 6 depicts an illustrative example of a hardware conflict based on exceeding the tuner capacity, in accordance with one embodiment. In the example shown in FIG. 6, a hardware recording device 602 is illustrated with tuners (604a, 604b, 604c and 604d) being connected to the hardware recording device. Although communication paths are not drawn between the hardware recording device and tuners, these devices may communicate with each other via communication paths described above. Each of the tuners (604a, 604b, 604c and 604d) can view or record a program of one or more first set of content items as scheduled by the user. For example, the user has four tuners available from the hardware recording device, and can schedule four different programs (604a, 604b, 604c and 604d) for simultaneous viewing or recording. The different programs (606a, 606b, 606c and 608a) can be any program the user desires to view or record, for example, "Friends," "The Bachelor," "Saturday Night Live," and a "World Cup Game". Content items (606a, 606b, and 606c) are scheduled for recording by the user. Content items (608a, 608b, and 608c) are content items predicted to be of interest to the user based on previous recording or viewing history. The hardware recording device can allocate the first tuner 604a to viewing or recording the show "Friends" 606a, the second tuner 604b to viewing or recording the show "The Bachelor" 606b, the third tuner 604c to viewing or recording the show "Saturday Night Live" 606c and the fourth tuner 604d to viewing or recording a content item predicted to be of interest "World Cup Game-USA vs. Mexico" 608a. The control circuitry will be unable to allocate a tuner to view or record content items predicted to be of interest "World Cup Game-Germany vs. Canada" 608b and "World Cup Game-Brazil vs. France" 608c because of lack of a sufficient number of tuners, thereby predicting a hardware conflict.

Figure 7:
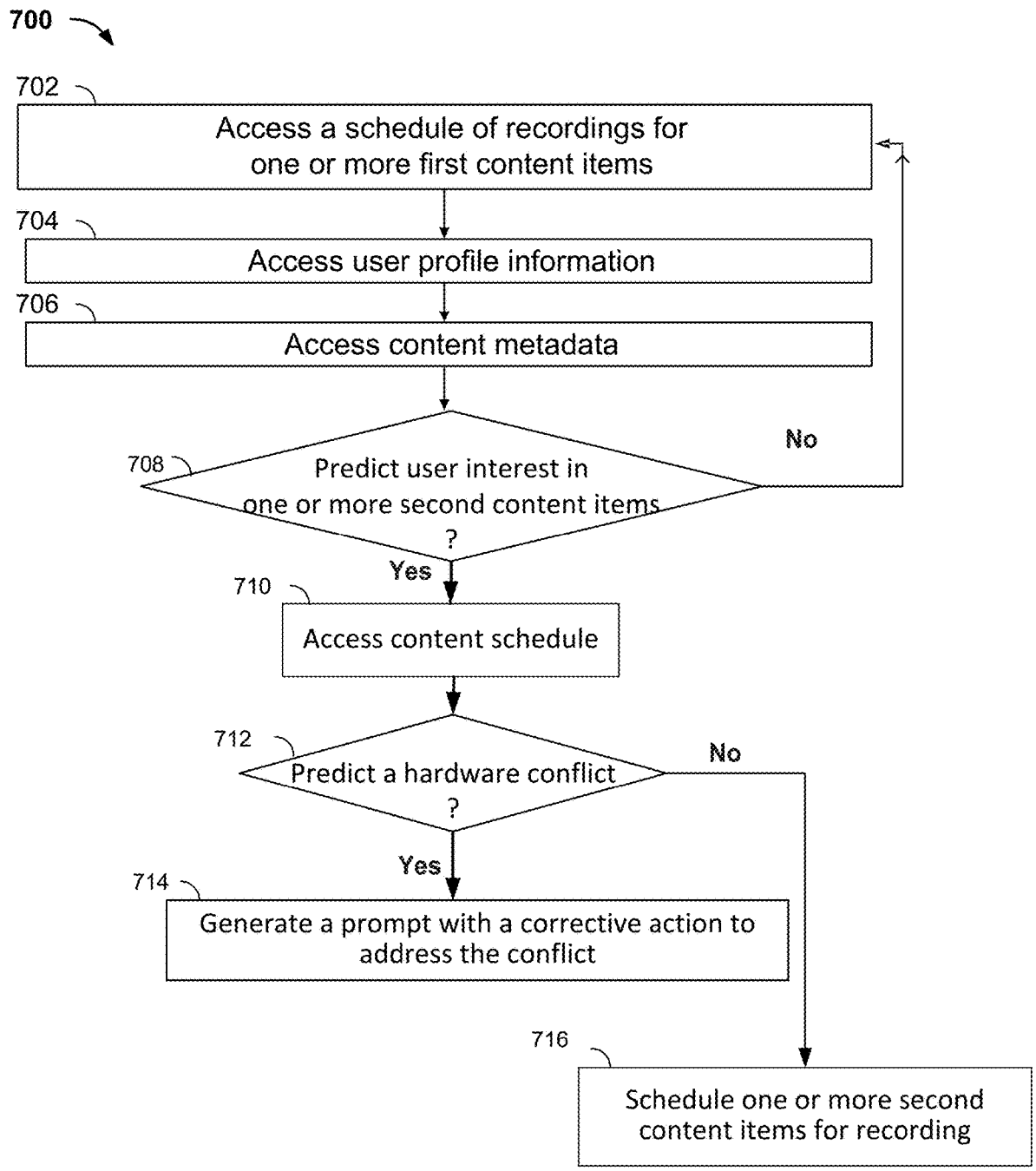
FIG. 7 is a flowchart of an illustrative process for predicting a hardware conflict and prompting for corrective action, in accordance with one embodiment.

FIG. 7 represents a process 700 implemented on control circuitry 212 for predicting a hardware conflict and prompting for corrective action, according to an embodiment of the disclosure. It should be noted that process 700 or any action thereof could be performed on, or provided by, any of the devices shown in FIGS. 2-6. For example, process 700 may be executed by control circuitry 212 (FIG. 2) as instructed by a media guidance application implemented on a server (e.g., media content source 302 and/or media guidance data source 304 (FIG. 3)). In addition, one or more actions of process 700 may be incorporated into or combined with one or more actions of any other process or embodiment described herein.

Process 700 begins at 702, where the processing circuitry may access a schedule of recordings for one or more first content items. For example, the user routinely watches a number of programs (e.g., "Friends," "The Bachelor," etc.) and has scheduled his recording hardware for viewing or recording this programing. At 704, where the processing circuitry may proceed depending on the outcome of step 702, that is, the processing circuitry accesses the user profile information (e.g., a user's previous recording or viewing history). For example, if the user has previously viewed or recorded soccer matches, the control circuitry may predict upcoming scheduled soccer matches (e.g., World Cup Games) will interest the user. The processing circuitry may proceed to step 706 after accessing the user profile, to access the content metadata. For example, the control circuitry will access metadata for all content scheduled to be recorded or not.

Next, at 708, the control circuitry predicts user interest in one or more second content items. The one or more second content items are selected based on user's previous recording or viewing history. If the control circuitry predicts the user's interest in one or more second content items ("Yes" at 708), then at 710, control circuitry accesses the content schedule of the one or more second content items. If, on the other hand, control circuitry does not predict the user's interest in one or more second content items ("No" at 710), then the control circuitry repeats 702.

At 712, in response to accessing the content schedule, control circuitry 212 predicts or does not predict a hardware conflict. If the control circuitry predicts a hardware conflict ("Yes" at 712), then, at 714, control circuitry generates a prompt with a corrective action to address the conflict. If, on the other hand, the control circuitry does not predict a hardware conflict ("No" at 716), then the control circuitry schedules the one or more second content items for recording.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-6 could be used to perform one or more of the actions in FIG. 7.

Figure 8:
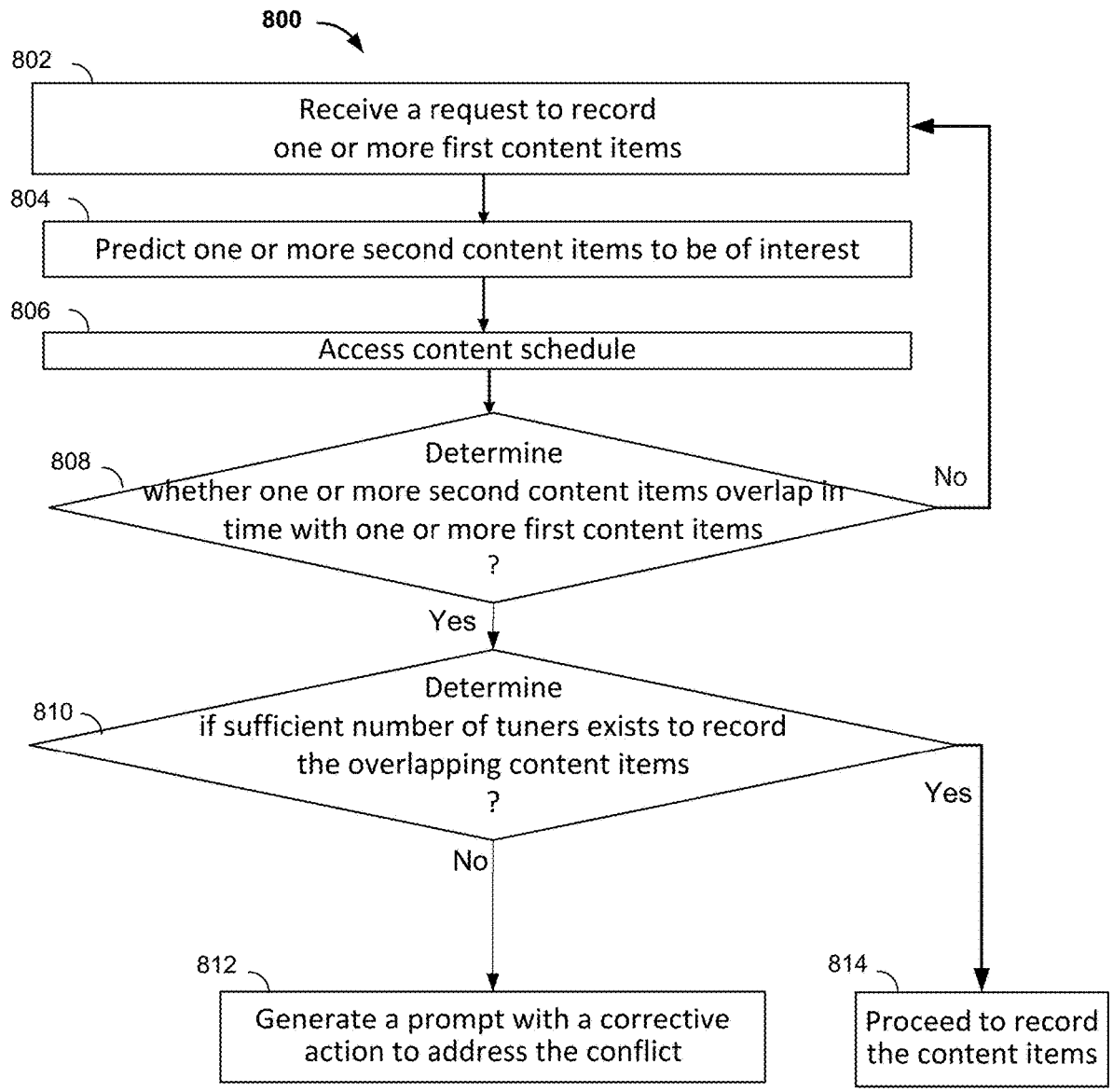
FIG. 8 is a flowchart of another illustrative process for predicting a hardware conflict and prompting for corrective action, in accordance with one embodiment.

FIG. 8 represents a process 800 implemented on control circuitry 212 for predicting a hardware conflict and prompting for corrective action according to an embodiment of the disclosure. It should be noted that process 800 or any action thereof could be performed on, or provided by, any of the devices shown in FIGS. 2-6. For example, process 800 may be executed by control circuitry 212 (FIG. 2) as instructed by a media guidance application implemented on a server (e.g., media content source 302 and/or media guidance data source 304 (FIG. 3)) in order to generate user equipment configuration data specific to a sub-region of a geographical region. In addition, one or more actions of process 800 may be incorporated into or combined with one or more actions of any other process or embodiment described herein.

Process 800 begins at 802, where the processing circuitry may receive a request to record one or more first content items. For example, the user routinely watches a number of programs (e.g., "Friends," "The Bachelor," etc.) and has scheduled his recording hardware for viewing or recording this programing. At 804, where the processing circuitry may proceed depending on the outcome of step 802, that is, the processing circuitry predicts one or more second content items to be of interest based on a user's previous recording or viewing history. For example, if the user has previously viewed or recorded soccer matches, the control circuitry may predict upcoming scheduled soccer matches (e.g., "World Cup Games") will interest the user. The processing circuitry may proceed to step 806, after predicting one or more second content items to be of interest, to access the content schedule.

Next, at 808, the control circuitry determines whether one or more second content items overlap in time with one or more first content items. If the control circuitry determines that one or more second content items overlap with the one or more first content item ("Yes" at 808), then, at 810, control circuitry determines if a sufficient number of tuners exist to record the overlapping content items. If, on the other hand, control circuitry determines no content items overlaps ("No" at 808), then the control circuitry repeats 802.

At 810, in response to accessing the content schedule, control circuitry 212 determines if a sufficient number of tuners exist to view or record the overlapping content items. If the control circuitry determines that not enough tuners are available to view or record the overlapping content items ("No" at 810), then at 812, control circuitry generates a prompt with a corrective action to address the conflict. If, on the other hand, control circuitry determines that a sufficient number of tuners are available to view or record the overlapping content items ("No" at 810), then, at 814, the control circuitry schedules the one or more second content items for recording.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 2-6 could be used to perform one or more of the actions in FIG. 8.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for predicting and resolving future hardware storage conflicts on a current hardware device, the method comprising:
    retrieving a schedule of recordings for one or more scheduled first content items and content metadata, wherein the content metadata corresponds to the one or more scheduled first content items and user profile information that characterizes user profile activity relative to the one or more scheduled first content items;
    predicting future user interest in one or more second content items based at least in part on the user profile information and the content metadata;
    retrieving a schedule that defines a timeline for one or more of recording or viewing the one or more second content items, wherein at least one of the one or more second content items is characterized by content metadata indicating the schedule of at least one of the one or more second content items is new relative to the schedule of recordings of the one or more scheduled first content items;
    comparing the schedule of recordings of the one or more scheduled first content items to the schedule of the one or more second content items to identify one or more overlaps in schedules;
    predicting a future hardware storage conflict based at least in part on:
        preexisting recordings stored on a storage of the current hardware device,
        a total storage capacity of the current hardware device,
        the predicted future user interest in the one or more second content items, wherein the predicted future user interest quantifies a likelihood that future user profile activity will include one or more of recording or viewing the one or more second content items, and
        the identified one or more overlaps of the schedule of recordings for the one or more scheduled first content items and the schedule of the one or more second content items; and
    based at least in part on predicting the future hardware storage conflict, generating for display a visual indicator of the future hardware storage conflict, and a prompt with a corrective action in advance of when the future hardware storage conflict would occur to address the future hardware storage conflict, wherein:
        the corrective action comprises an option to upgrade to a new hardware device with more storage and additional tuners as compared to the current hardware device,
        the visual indicator of the future hardware storage conflict includes a first depiction of the total storage capacity, a second depiction of a storage capacity for the one or more scheduled first content items, and a third depiction of a predicted additional storage capacity for the one or more second content items, and
        the visual indicator depicts a sum of the storage capacity for the one or more scheduled first content items and the predicted additional storage capacity for the one or more second content items including depiction of the sum when the sum exceeds the total storage capacity.

2. The method of claim 1, wherein predicting the future hardware storage conflict comprises:
    determining whether the one or more second content items overlaps in time with any of the one or more first content items;
    based at least in part on determining that the one or more second content items overlap in time with at least one of the one or more first content items, determining whether there are a sufficient number of tuners available to tune to the overlapping content items; and
    based at least in part on determining that there is not a sufficient number of tuners, predicting the future hardware storage conflict.

3. The method of claim 2, wherein determining whether the one or more second content items overlaps in time with any of the one or more first content items comprises:
    identifying a start time and an end time of the one or more first content items;
    identifying a start time and an end time of the one or more second content items;
    determining whether the start time and the end time of the one or more first content items fall within the start time and the end time of the one or more second content items; and
    based at least in part on determining that the start time and the end time of the one or more first content items fall within the start time and the end time of the one or more second content items, determining an overlapping content item.

4. The method of claim 1, wherein predicting the future hardware storage conflict comprises:
    determining a current amount of available storage space on a storage device, wherein the storage device comprises a plurality of tuners;
    calculating a first amount of storage space needed for recording the one or more first content items over a first time period;
    calculating a second amount of storage space needed for recording the one or more second content items over the first time period; and
    predicting the future hardware storage conflict based at least in part on the current amount of available storage space, the first amount of storage space, and the second amount of storage space.

5. The method of claim 1, wherein predicting the future hardware storage conflict comprises:
    determining a maximum number of overlapping content items from all of the first content items and second content items; and
    based at least in part on determining that the maximum number of overlapping content items exceeds a number of tuners available, predicting the future hardware storage conflict.

6. The method of claim 1, wherein predicting the future user interest in one or more second content items based at least in part on the user profile information and the content metadata comprises:
    receiving user preference data from the user profile information; and
    searching available content items based at least in part on the user preference data to identify the one or more second content items having content metadata related to the user preference data.

7. The method of claim 1, wherein the future hardware storage conflict comprises a future hardware storage space conflict.

8. The method of claim 1, wherein the content metadata further comprises content metadata of content items not scheduled to be recorded.

9. The method of claim 1, wherein the visual indicator of the future hardware storage conflict includes:
   a depiction of the identified overlap of the schedule of recordings for the one or more scheduled first content items; and
   the content schedule for the predicted future user interest in the one or more second content items.

10. A system for predicting and resolving future hardware storage conflicts, the system comprising:
    a current hardware storage device for viewing and recording content items; and
    circuitry configured to:
       retrieve a schedule of recordings for one or more scheduled first content items and content metadata, wherein the content metadata corresponds to the one or more scheduled first content items and user profile information that characterizes user profile activity relative to the one or more scheduled first content items;
       predict future user interest in one or more second content items based at least in part on the user profile information and the content metadata;
       retrieve a schedule that defines a timeline for one or more of recording or viewing the one or more second content items, wherein at least one of the one or more second content items is characterized by content metadata indicating the schedule of at least one of the one or more second content items is new relative to the schedule of recordings of the one or more scheduled first content items;
       compare the schedule of recordings of the one or more scheduled first content items to the schedule of the one or more second content items to identify one or more overlaps in schedules;
       predict a future hardware storage conflict based at least in part on:
          preexisting recordings stored on a storage of the current hardware device,
          a total storage capacity of the current hardware device,
          the predicted future user interest in the one or more second content items, wherein the predicted future user interest quantifies a likelihood that future user profile activity will include one or more of recording or viewing the one or more second content items,
          the identified one or more overlaps of the schedule of recordings for the one or more scheduled first content items and the schedule of the one or more second content items; and
       based at least in part on predicting the future hardware storage conflict, generate for display a visual indicator of the future hardware storage conflict, and a prompt with a corrective action in advance of when the future hardware storage conflict would occur to address the future hardware storage conflict, wherein:
          the corrective action comprises an option to upgrade to a new hardware device with more storage and additional tuners as compared to the current hardware device,
          the visual indicator of the future hardware storage conflict includes a first depiction of the total storage capacity, a second depiction of a storage capacity for the one or more scheduled first content items, and a third depiction of a predicted additional storage capacity for the one or more second content items, and
          the visual indicator depicts a sum of the storage capacity for the one or more scheduled first content items and the predicted additional storage capacity for the one or more second content items including depiction of the sum when the sum exceeds the total storage capacity.

11. The system of claim 10, wherein the circuitry configured to predict the future hardware storage conflict comprises:
    determine whether the one or more second content items overlaps in time with any of the one or more first content items;
    based at least in part on determining that the one or more second content items overlaps in time with at least one of the one or more first content items, determine whether there are a sufficient number of tuners available to tune to the overlapping content items; and
    based at least in part on determining that there is not a sufficient number of tuners, predicting the future hardware storage conflict.

12. The system of claim 11, wherein the circuitry configured to determine whether the one or more second content items overlaps in time with any of the one or more first content items comprises:
    identify a start time and an end time of the one or more first content items;
    identify a start time and an end time of the one or more second content items;
    determine the start time and the end time of the one or more first content items overlaps within the start time and the end time of the one or more second content items; and
    based at least in part on determining the start time and the end time of the one or more first content items overlap within the start time and the end time of the one or more second content items, determine an overlapping content item.

13. The system of claim 10, wherein the circuitry configured to predict the future hardware storage conflict comprises:
    determine a current amount of available storage space on a storage device, wherein the storage device comprises a plurality of tuners;
    calculate a first amount of storage space needed for recording the one or more first content items over a first time period;
    calculate a second amount of storage space needed for recording the one or more second content items over the first time period; and
    predict the future hardware storage conflict based at least in part on the current amount of available storage space, the first amount of storage space, and the second amount of storage space.

14. The system of claim 10, wherein the circuitry configured to predict the future hardware storage conflict comprises:
    determine a maximum number of overlapping content items from all of the first content items and second content items; and based at least in part on determining that the maximum number of overlapping content items exceeds a number of tuners available, predict the future hardware storage conflict.

15. The system of claim 10, wherein the circuitry configured to predict the future user interest in one or more second content items based at least in part on the user profile information and the content metadata comprises:
   receive user preference data from the user profile information; and
   search available content items based at least in part on the user preference data to identify the one or more second content items having content metadata related to the user preference data.

16. The system of claim 10, wherein the future hardware storage conflict comprises a future hardware storage space conflict.

17. The system of claim 10, wherein the content metadata further comprises content metadata of content items not scheduled to be recorded.

18. The system of claim 10, wherein the visual indicator of the future hardware storage conflict includes:
   a depiction of the identified overlap of the schedule of recordings for the one or more scheduled first content items; and
   the content schedule for the predicted future user interest in the one or more second content items.

19. A non-transitory computer readable medium for predicting and resolving future hardware and/or cloud storage conflicts on a current hardware device, the non-transitory computer readable medium comprising instructions that when executed by circuitry causes the circuitry to:
   retrieve a schedule of recordings for one or more scheduled first content items and content metadata, wherein the content metadata corresponds to the one or more scheduled first content items and user profile information that characterizes user profile activity relative to the one or more scheduled first content items;
   predict future user interest in one or more second content items based at least in part on the user profile information and the content metadata;
   retrieve a schedule that defines a timeline for one or more of recording or viewing the one or more second content items, wherein at least one of the one or more second content items is characterized by content metadata indicating the schedule of at least one of the one or more second content items is new relative to the schedule of recordings of the one or more scheduled first content items;
   compare the schedule of recordings of the one or more scheduled first content items to the schedule of the one or more second content items to identify one or more overlaps in schedules;
   predict a future hardware storage conflict based at least in part on:
      preexisting recordings stored on a storage of the current hardware device,
      a total storage capacity of the current hardware device, the predicted future user interest in the one or more second content items, wherein the predicted future user interest quantifies a likelihood that future user profile activity will include one or more of recording or viewing the one or more second content items,
      the identified one or more overlaps of the schedule of recordings for the one or more scheduled first content items and the schedule of the one or more second content items; and
   based at least in part on predicting the future hardware storage conflict, generate for display a visual indicator of the future hardware storage conflict, and a prompt with a corrective action in advance of when the future hardware storage conflict would occur to address the future hardware storage conflict, wherein:
      the corrective action comprises an option to upgrade to a new hardware device with more storage and additional tuners as compared to the current hardware device,
      the visual indicator of the future hardware storage conflict includes a first depiction of the total storage capacity, a second depiction of a storage capacity for the one or more scheduled first content items, and a third depiction of a predicted additional storage capacity for the one or more second content items, and
      the visual indicator depicts a sum of the storage capacity for the one or more scheduled first content items and the predicted additional storage capacity for the one or more second content items including depiction of the sum when the sum exceeds the total storage capacity.

20. The non-transitory computer-readable medium of claim 19, wherein the circuitry configured to predict the future hardware storage conflict comprises:
   determine whether the one or more second content items overlaps in time with any of the one or more first content items;
   based at least in part on determining that the one or more second content items overlaps in time with at least one of the one or more first content items, determine whether there are a sufficient number of tuners available to tune to the overlapping content items; and
   based at least in part on determining that there is not a sufficient number of tuners, predicting the future hardware storage conflict.

21. The non-transitory computer-readable medium of claim 19, wherein the visual indicator of the future hardware storage conflict includes:
   a depiction of the identified overlap of the schedule of recordings for the one or more scheduled first content items; and
   the content schedule for the predicted future user interest in the one or more second content items.

* * * * *